March 11, 1930. A. W. MORTON 1,749,832
PISTON RING
Filed Dec. 7, 1928
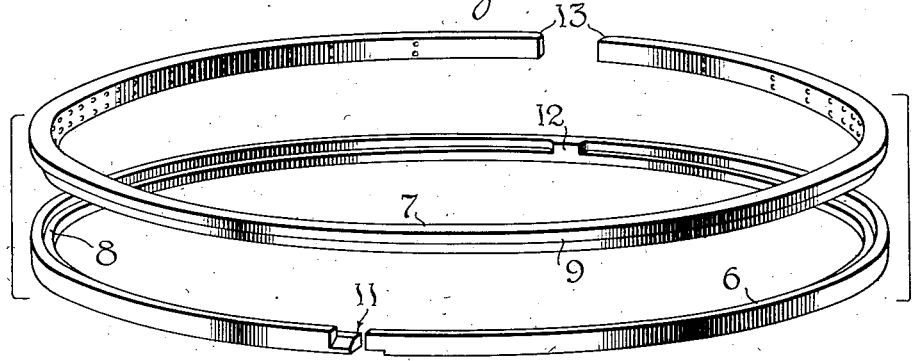
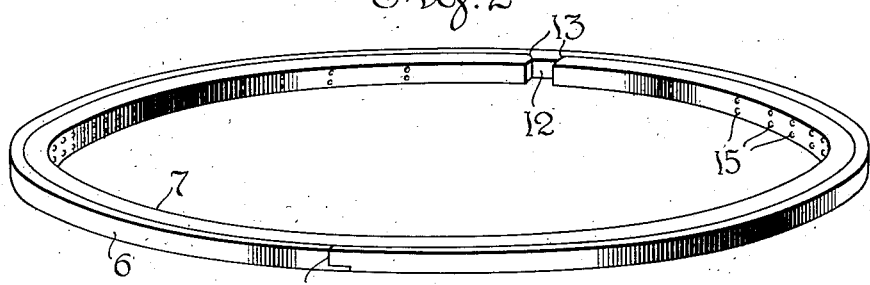
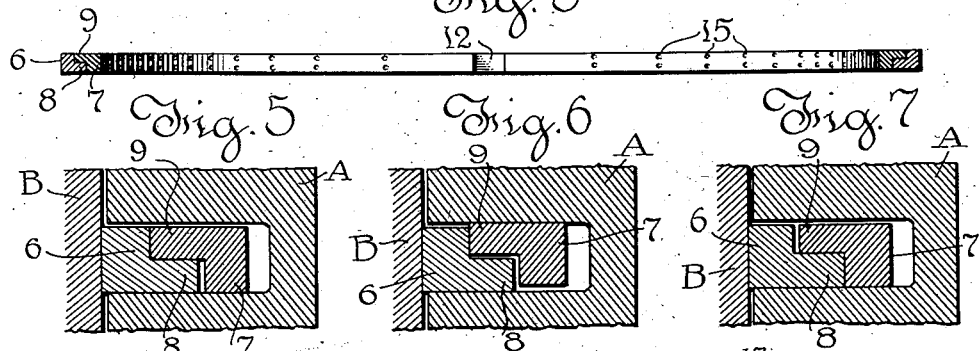
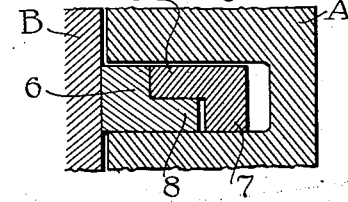
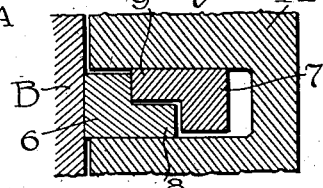
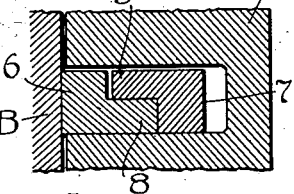
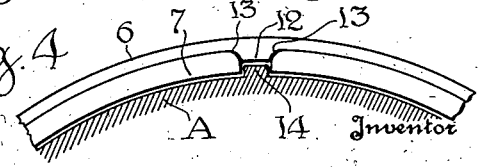
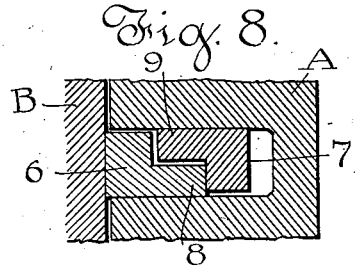
Inventor
Allen W. Morton
By Dodge
Attorneys Patented Mar. 11, 1930

1,749,832

UNITED STATES PATENT OFFICE

ALLEN W. MORTON, OF BALTIMORE, MARYLAND, ASSIGNOR TO THE AMERICAN HAMMERED PISTON RING COMPANY, OF BALTIMORE, MARYLAND, A CORPORATION OF MARYLAND

PISTON RING

Application filed December 7, 1928. Serial No. 324,461.

This invention relates to piston packing rings, and particularly to rings made up of two resilient elements.

The purpose of the invention is to produce a ring of this general character which is rectangular in cross section so as to be received in a piston ring groove of conventional form.

A further object of the invention is to insure that only one of the ring elements contacts the cylinder walls, both elements having portions which contact the side walls of the groove.

Further objects of the invention have to do with the production of a uniform expansive tendency throughout the circumference of the ring structure; the production of satisfactory sealing between the split ends of the outer ring element and between the two assembled ring elements; the maintenance of the gaps in staggered relation, and other details which will be apparent to those skilled in the art upon consideration of the following detailed description.

A preferred embodiment of the invention is illustrated in the accompanying drawing, in which,—

Fig. 1 is a perspective view of the two ring elements, separated from each other.

Fig. 2 is a perspective view of the ring structure with the two elements assembled and contracted to their minimum diameter.

Fig. 3 is a transverse section of the ring structure.

Fig. 4 is a detail view showing the ring in a groove in a piston and illustrating the alining lug or pin which is used in cases where the ring is to travel over cylinder ports.

Fig. 5 is an enlarged fragmentary axial section through a piston and cylinder showing the ring on the up travel of the piston.

Fig. 6 is a similar view showing the positions assumed when the ring moves downward under pressure.

Figs. 7 and 8 are similar to Figs. 5 and 6, respectively, but show a slightly modified construction.

The complete ring structure is made up of two elements, an outer ring element 6, which has many of the characteristics of an ordinary snap ring, and a specially related inner ring element 7, which has many of the characteristics of a resilient expander ring.

Viewed in section, the outer ring section 6 may be described as L-shaped in cross section, that is, it has at one side an inwardly extending flange 8. Similarly ring 7 has an outwardly extending flange 9, which is on the opposite edge from the flange 8 and overlaps the same. The extremity of one flange seats against the body of the companion ring, but there is clearance between the extremity of the other flange and the body of the first ring. The two flanges are preferably of the same thickness between plane surfaces, but where extra outward pressure of the inner ring is desired, the flange on the inner ring may be increased and that on the outer ring may be correspondingly decreased in thickness.

The preferred arrangement is that shown in Figs. 5 and 6 in which flange 9 contacts the body of ring 6 and there is a slight clearance between flange 8 and body 7. The alternative arrangement is shown in Figs. 7 and 8 in which flange 8 contacts body 7 and a clearance exists between body 6 and flange 9. The operative characteristics of each will be later explained.

It is important to observe that with the two ring elements assembled to form the complete ring structure, this ring structure has a rectangular section so as to be received in an ordinary ring groove, and the zig-zag line of contact between the two sections terminates at the plane surfaces which bound the ring, as contradistinguished from the cylindrical bounding surfaces. The effect of this is that the outer ring element 6 alone contacts the cylinder wall, and the joint between the two ring elements does not extend to the cylinder contacting surface. This is an important feature in the reduction of wear both on the cylinder wall and on the ring groove in the piston, as will be explained, and assists in the securing of a tight seal with the sides of the groove by the action of the fluid pressure whose leakage is resisted.

The outer ring section 6 is, of course, split to permit it to expand, and any type of leak-resisting joint might be used. I indicate at 11 a known type of bevel step joint, but contemplate using any known joint.

It is necessary that the splits in the two ring sections be staggered and preferable that they be displaced 180° from each other. Staggering reduces the tendency to leakage and may be arranged to give a uniform expansive tendency. To maintain the desired relation of the ring sections the recess at the side of flange 8 is interrupted for a short distance to leave the boss indicated at 12. The sides of the boss are curved or filleted to avoid the formation of incipient cracks. The ends of the flange 9 are cut away as indicated at 13, to fit approximately the sides of the boss 12 when the ring is in its most contracted position (see Figs. 2 and 4). While it is sufficient merely to cut away the ends of the flange 9, it simplifies manufacture to cut away the ends of the inner ring. This arrangement gives clearance for a positioning pin or stud 14, shown in Fig. 4, in the base of the ring groove. This prevents the rotation of the ring in the piston and is necessary where the ring travels over cylinder ports.

In order to control and properly distribute the expansive tendency of the inner ring 7, this may be hammered or peened on its inner surface, in a manner well known in the art. The hammer marks, which are variably spaced according to known practice, are indicated at 15. Equivalent methods known in the art, such as heat treatment while held out of round, turning the ring out of round, manufacturing from out of round castings, and the like, may be adopted to secure similar results.

A compound ring constructed as above described presents to the cylinder wall a practically continuous sealing surface. Because of the reverse arrangements of the two rings there is an inherent tendency to produce an equalized outward tendency throughout the circumference of the compound ring, and this effect can be enhanced by special treatment of the inner ring, as suggested.

The formation of the lug which holds the two rings in a definite relation integral with the outer ring avoids the weakening effect of inserted pins, and because of its curved or filleted form precludes the formation of incipient cracks, such as are likely to occur at sharp corners. Furthermore, the ring is so designed as to reduce the tendency to wear the plane or side faces of the ring grooves, severe wear at such points being one of the undesirable characteristics of prior duplex rings.

At the present time probably the largest field for duplex rings is as replacement rings in Diesel engines, notably marine engines. They are used to take the place of one-piece rings which cannot satisfactorily be replaced with another one-piece ring because of wear in the ring grooves and because of the worn condition of the cylinder and piston. It follows that a duplex ring normally encounters adverse conditions, being used to put off as long as possible the day of a thorough overhaul. In selecting such rings engineers customarily place the first emphasis in the seal at the joint of the ring, and next they demand a ring which will seal in the groove of the piston. Contrary to the conditions in a new engine, the seal of the ring with the cylinder wall is generally regarded as the least important point, on the theory that the ring will seat in sooner or later, and that during such seating the leakage at the joint in the ring and the leakage through the grooves will gradually increase. This explains the growing use of the duplex ring, but all prior duplex rings, so far as I am advised, have consisted of two parts, each of which contacted the cylinder wall. The effect was to produce ring sections which were so narrow that they were torsionally flexed during the reciprocations of the piston. This causes uneven wear of the ring and rapid wear of the groove.

The characteristic of the present ring in presenting to the cylinder wall a single ring unit and to form that unit with a flange which gives it considerable depth of engagement with the ring groove, reduces in a marked degree the tendency for torsional flexure to occur with its accompanying wear on the ring and groove. It also avoids frail sections such as are common in duplex rings of the prior art. The importance of this is accentuated by the modern tendency toward very narrow piston rings.

While rings of the type above disclosed might be placed in a groove either side up, the better practice is to mount the rings so that the pressure whose leakage is resisted will seat the outer ring against its broad face. This arrangement is shown in Fig. 5 in which the pressure is supposed to act on piston A in a downward direction. In such case the outer section 6 will be seated against its broad plane face at all times in a two stroke cycle engine and in a four stroke cycle it will be seated against the broad plane face on the compression, working and exhaust strokes, and against the narrow plane face on only the suction stroke.

It has been explained that only one of the flanges, preferably the flange 9, of the inner ring, seats against the body of the other (preferably the outer ring). From theoretical considerations one would assume that it would be better to have both flanges seat, but the fact is that in manufacture it is practically impossible to accomplish this result and tests show that better results are secured when only one flange seats.

Figs. 5 and 6 illustrate the preferred construction. In Fig. 5 the parts are shown positioned as they are at or about the moment of ignition, at which time the piston A is still moving upward relatively to cylinder wall B.

on the compression stroke. Fig. 6 shows the two ring sections 6 and 7 blown apart by gases entering the ring groove. The effect is to produce a tight seal of the ring in its groove.

Figs. 7 and 8 show the reverse clearance arrangement, Fig. 7 showing the condition at the ignition point, as in Fig. 5, and Fig. 8 the condition on the working stroke after the gas pressures have penetrated the ring groove.

As suggested the ring is subject to some modification as to detail and the scope of the invention is defined in the claims, the description of a specific embodiment being not intended to have a limiting effect.

What is claimed is,—

1. A piston ring structure comprising two resilient split ring elements, one ring encircling the other with their splits staggered, the inner ring having an outwardly projecting flange and the outer ring having an inwardly projecting flange, said flanges overlapping, and one only of said flanges engaging the body of the other ring.

2. A piston ring structure comprising two resilient split ring elements, one ring encircling the other with their splits staggered, the inner ring having an outwardly projecting flange and the outer ring having an inwardly projecting flange, said flanges overlapping, the first named flange having slightly the greater radial dimension.

3. A piston ring structure comprising two resilient split ring elements of equal thickness between plane surfaces, one ring encircling the other with their splits staggered, the inner ring having an outwardly projecting flange and the outer ring having an inwardly projecting flange, said flanges alone overlapping, and the flange of one ring only contacting the body of the other ring.

4. A piston ring structure comprising two resilient split ring elements of equal thickness between plane surfaces, one ring encircling the other with their splits staggered, the inner ring having an outwardly projecting flange and the outer ring having an inwardly projecting flange, said flanges overlapping, the flange of one ring only contacting the body of the other ring, there being a gap between the ends of the flanges of the inner ring in the contracted position of the ring structure; and a boss on the outer ring substantially filling said gap.

5. The combination with a piston having a groove and a stud located in the bottom of said groove, of a piston ring structure comprising two resilient split ring elements of equal thickness between plane surfaces, one ring encircling the other with their splits staggered, the inner ring having an outwardly projecting flange and the outer ring having an inwardly projecting flange, said flanges overlapping, there being a lug at the side of the flange on the outer ring and a gap between the ends of the inner ring which receives said stud and said lug.

6. A piston ring structure comprising two resilient split ring elements of equal thickness between plane surfaces, one ring encircling the other with their splits staggered, the inner ring having an outwardly projecting flange and the outer ring having an inwardly projecting flange, said flanges overlapping, and only one contacting the body of the other ring, there being a gap between the flange ends of the inner ring in the contracted position of the ring structure, and a boss on the outer ring substantially filling said gap.

7. A piston ring structure of rectangular cross section made up of two expansible split rings, each L-shaped in cross section, one encircling the other, with their re-entrant faces juxtaposed, the parts being so arranged that the outer ring only contacts the cylinder wall, and the peripheral face of the outwardly projecting section of the inner L-shaped ring alone contacts the outer ring.

8. A piston ring structure comprising two resilient split ring elements of equal dimension between plane surfaces, one ring encircling the other, with their splits displaced approximately diametrically from each other, the outer ring having an inwardly projecting flange and the inner ring having an outwardly projecting flange which overlaps the flange on the outer ring, the flange of the inner ring alone contacting the body of the outer ring, said inner ring having a greater outward resilient tendency than that of the outer ring.

In testimony whereof I have signed my name to this specification.

ALLEN W. MORTON.